United States Patent [19]
Wagner et al.

[11] 3,801,278
[45] Apr. 2, 1974

[54] STERILIZING APPARATUS FOR HYDROPHILIC CONTACT LENSES

[75] Inventors: Hubert Wagner; Darrlle D. Moore, both of Dubuque, Iowa

[73] Assignee: Sybron Corporation, Rochester, N.Y.

[22] Filed: Mar. 13, 1972

[21] Appl. No.: 234,020

[52] U.S. Cl............ 21/86, 21/105, 219/417, 219/430, 219/439, 219/478, 219/521
[51] Int. Cl........ A61l 3/00, A61l 7/00, F27d 11/00
[58] Field of Search............. 21/86, 87, 88, 89, 90, 21/119, 85, 105; 219/282, 415, 416, 417, 418, 419, 476, 477, 478; 206/5 A; 351/160

[56] References Cited
UNITED STATES PATENTS

| | | | |
|---|---|---|---|
| 2,379,504 | 7/1945 | Thompson | 219/282 |
| 1,336,728 | 4/1920 | Christensen | 219/282 |
| 3,345,497 | 10/1967 | Porteous | 219/419 X |
| 3,514,908 | 6/1970 | Herbert et al. | 51/284 |
| 3,220,960 | 11/1965 | Wichterle | 351/160 X |
| 3,519,005 | 7/1970 | Krezanoski et al. | 206/5 A X |
| 3,041,146 | 6/1962 | Kuzell | 23/230 B X |
| 3,634,651 | 1/1972 | Siegel et al. | 219/386 X |

Primary Examiner—Morris O. Wolk
Assistant Examiner—Arnold Turk
Attorney, Agent, or Firm—Theodore B. Roessel; Roger Aceto

[57] ABSTRACT

Apparatus for sterilizing hydrophilic contact lenses. In the apparatus housing are two compartments, one compartment for sterilizing sealed vials filled with a saline solution and the contact lenses, and another compartment for maintaining squeeze bottles of the saline solution at an aseptizing temperature. Each compartment has its own heating element and thermostat control with the overall cycle of operation of both compartments being controlled by a single timer.

10 Claims, 2 Drawing Figures

3,801,278

3,801,278

STERILIZING APPARATUS FOR HYDROPHILIC CONTACT LENSES

BACKGROUND OF THE INVENTION

The present invention relates to apparatus for use by ophthalmologists and the like, for sterilizing hydrophilic contact lenses in bulk and for asepticizing containers of the saline solution in which the lenses are sterilized.

Hydrophilic contact lenses are water absorbent, and therefore require sterilization by heating in an aqueous saline solution before being fitted to the patient's eye. In fitting a patient with hydrophilic contact lenses, several lenses may be tried before a proper fitting pair of lenses are found. For this reason, apparatus for sterilizing lenses in bulk is required.

Heretofore sterilization of hydrophilic lenses has been accomplished by sealing the lenses in vials containing a saline solution and then placing the vials in a water bath. However, water baths can only reach a temperature of 100° C. which in all cases might not be sufficient to ensure proper sterilization of the lenses sealed in the vials.

It is also desirable for the physician to have on hand quantities of aseptic saline solution for placing in these vials prior to sterilizing. An aseptic solution is one which has been sterlized and then held at a temperature high enough to inhibit regrowth of bacteria.

In the present invention, apparatus is provided which permits bulk sterilization at a temperature of approximately 124° C. of vials containing hydrophilic contact lenses, while at the same time providing an asepticizing temperature of approximately 90° C. for containers of the saline solution.

SUMMARY OF THE PRESENT INVENTION

The present invention may be characterized in one aspect thereof, by the provision of a housing having insulating means dividing the housing into two compartments, a sterilizing compartment and an asepticizer compartment. The sterilizing compartment is more particularly formed by a first block member of heat conducting material having a rectangular recess therein, the block being held at a temperature of 124° C. The asepticizer compartment is formed by a second block member of heat conducting material held at a temperature of 90° C. Plastic squeeze bottles filled with saline solution are placed in wells formed in the second block member and sealed vials containing saline solution and the hydrophilic contact lenses are placed in a removable tray which rests within the recess of the first block member. Each compartment in the housing has its own heating element and thermostat control but a single timer controls the cycle of operation of both compartments.

OBJECTS OF THE INVENTION

One object of the present invention is to provide a single unit apparatus for simultaneously sterilizing bulk quantities of hydrophilic contact lenses and asepticizing bulk quantities of saline solutions.

Another object of the present invention is to provide a sterilizer-asepticizer apparatus for hydrophilic contact lenses, wherein sterilization of the lens takes place at a temperature of approximately 124° C.

A further object of the present invention is to provide apparatus having one compartment for sterilizing hydrophilic contact lenses and another compartment for asepticizing saline solution, wherein the cycle of operation of both compartments is controlled by a single timing apparatus.

These and other objects, advantages and characterizing features of the present invention will become more apparent upon consideration of the following detailed description thereof when taken in connection with the accompanying drawings depicting the same.

DESCRIPTION OF THE PREFERRED EMBODIMENTS

Figure 1:
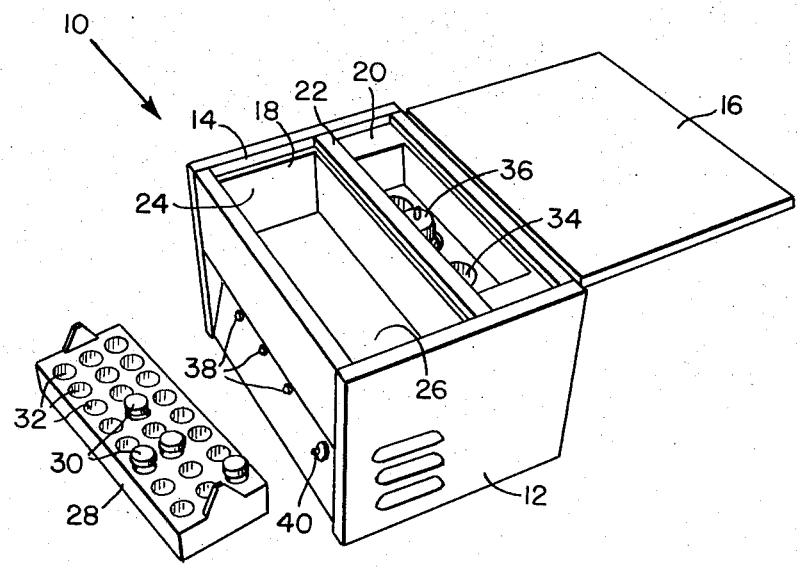
FIG. 1 is a top perspective view of the present invention, showing the sterilizer tray removed from the apparatus.

Referring to the drawings, FIG. 1 shows the apparatus generally indicated at 10. The apparatus includes a housing 12 open at its top 14, the open top being closed by any suitable closure such as a hinged door or sliding cover 16. Within the housing are two block members 18 and 20 of heat conducting material which are separated by any suitable heat insulating means 22 such as an air gap or wall of insulating material. Block member 18 forms the sterilizer compartment and block 20 the asepticizer compartment in a manner set out hereinbelow.

Block member 18 forming the sterilizing compartment is provided with a rectangular recess 24. Designed to fit into this recess and rest on the bottom 26 of the recess is a tray 28, made of any suitable heat conducting material, such as aluminum. The tray is designed to carry a plurality of vials 30, each vial containing the hydrophilic contact lenses and saline solution. Tray 28 can simply be an open tray. Preferably, however, the tray is formed with a plurality of compartments 32, as shown, for holding individual vials. In this respect the dimensional tolerances of these tray compartments 32 should closely fit the vials to maximize the interface areas and thus maximize the heat flow rate from the tray to the vials. In the same respect, the tray should rest as flat as possible on recess bottom 26 to maximize the heat flow rate from the block member 18 to the tray.

Block member 20 forming the asepticizer compartment is provided with a plurality of wells 34, each designed to receive a plastic squeeze bottle 36 filled with the saline solution. The dimensional tolerances of wells 34 should closely fit these squeeze bottles for optimum heat flow from the block member to the bottles.

The front of housing 12 is provided with pilot lights 38 which indicate when the various heating elements (to be described hereinbelow) are operating. Also on the front of the housing is a timer actuation push button 40 for starting the cycle of operation.

Figure 2:
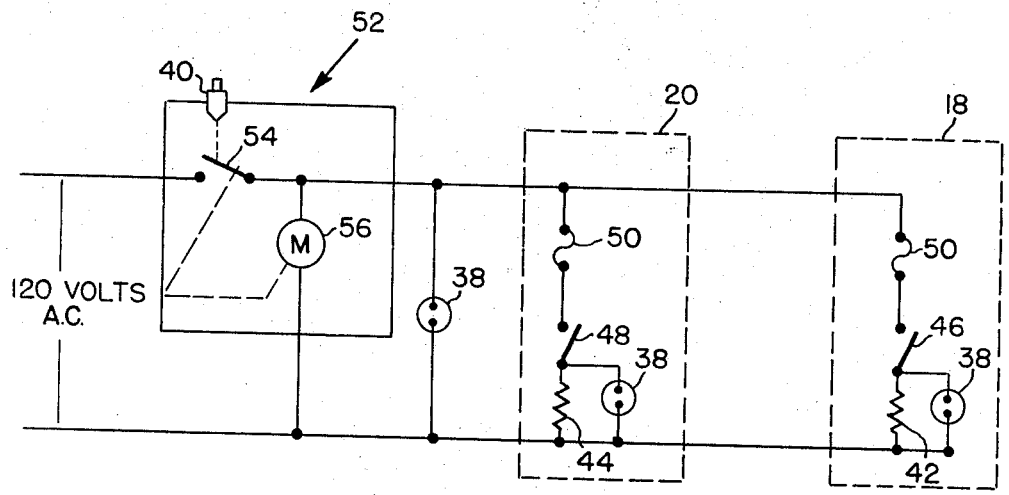
FIG. 2 is a schematic of the electrical system of the apparatus.

Referring to FIG. 2, the schematic of the apparatus shows the sterilizer and asepticizer sections 18 and 20 enclosed in dotted lines. Each section has its own electric heating element, 42, 44, and thermostat 46, 48 respectively. An appropriate fuse 50 may be provided for each section to prevent the danger of over heating, should the thermostat fail.

The schematic shows that the two heaters and their thermostats are connected in a parallel circuit which is in turn connected in series with a timer mechanism generally indicated at 52. Thus electric power to both heaters 42 and 44 is controlled by this timer mechanism. It should be appreciated that when push button 40 on the timer is pressed, a timer switch 54 is closed. Closing switch 54 in turn delivers power to both the heating elements and starts timer motor 56. At the end of the cycle, when motor 56 times out, switch 54 is opened, cutting off the power to the heating elements.

In operation, then, up to four 4 oz. squeeze bottles of saline solution may be placed in wells 34. Tray 28 is then loaded with up to 24 vials, and the tray lowered into recess 24 and onto the bottom 26 of block member 18. Cover 16 is moved to close the housing opening and the timer actuation button 40 pushed to initiate the cycle.

Heating element 42 and its thermostat 46 in the sterilizer section are pre-adjusted to insure a sterilization temperature of approximately 124° C. and to maintain this temperature level for approximately 15 minutes. Heating element 44 and its thermostat 48 in the asepticizer section are adjusted to insure that a maximum of 90° C. is maintained in the section for approximately 10 minutes. The 15 minute sterilizing cycle at 124° C. and the 10 minute asepticizing cycle at 90° C. are all accomplished within an overall 75 minute time cycle, as controlled by electric timer 52. For example, if the start of the cycle is time 0 or T-0, and the end of the cycle is 75 minutes later or T-75, it is well within the art to proportion the wattage of heating elements 42 and 44, the mass of block members 18 and 20, and various other factors so as to insure that vials 30 will reach the sterilizing temperature of 124° C. at or before T-60 and the plastic squeeze bottles 36 filled with the saline solution will reach a temperature of 90°C at or before T-65 minutes. In such a case, both the vials and squeeze bottles will be maintained at the desired temperature for the desired length of time, that is 15 and 10 minutes respectively when the clock timer expires at T-75 minutes.

Thus it should be appreciated that the present invention accomplishes its intended objects in providing in one unit the facilities to both sterilize in bulk hydrophilic contact lenses and to provide a quantity of aseptic saline solution in which the lenses are placed for sterilization. The use of two separate heating elements and thermostats ensures the proper temperature for each compartment, with the cycle of operation in both compartments being initiated and controlled by a single timing apparatus.

Having thus described the invention in detail, what is claimed as new is:

1. Hydrophilic contact lens sterilizing apparatus comprising:
    a. a housing having a top opening to permit access into the housing;
    b. a first heater block member in said housing, said block having a recess therein defining the bottom and sides of a compartment, said block member including means for maintaining said block at a sterilizing temperature above 100° C.;
    c. a second block member of heat conducting material in said housing forming an asepticizer compartment including means for maintaining said second block member at an asepticizing temperature below said sterilizing temperature, said second block member being adapted to receive containers of saline solution;
    d. heat insulating means separating said first and second block members;
    e. a removable tray of heat conducting material adapted to rest in said recess and receive heat from said first heater block member, said tray being adapted to accomodate a plurality of sealed vials containing saline solution and the hydrophilic contact lenses; and
    f. timer means controlling the cycle of operation of said means for maintaining temperature of said block members.

2. Apparatus as set forth in claim 1, wherein said second block member is provided with a plurality of wells for receiving said containers of saline solution.

3. Apparatus as set forth in claim 1, wherein said removable tray is sectioned into a plurality of compartments, each receiving one of said vials.

4. Apparatus as set forth in claim 1, wherein said means for maintaining the temperature of said block members include two heating elements and two thermostats, one heating element and thermostat being associated with each of said block members.

5. Apparatus as set forth in claim 4, wherein the heater element and thermostat associated with said first heater block member maintain the temperature thereof at about 124° C. and the heater element and thermostat associated with said second block member maintain the temperature thereof at about 90° C.

6. Apparatus as set forth in claim 4, wherein said timer means controls the operation of both of said heating elements.

7. Apparatus as set forth in claim 6, wherein said two heater elements and thermostats are in parallel circuits connected in series with a switch, said switch being closed to deliver power to said timer and parallel circuits and said timer operating to open said switch after a timed cycle of operation.

8. Hydrophilic contact lens sterilizing apparatus comprising:
    a. a housing having a top opening to permit access into the interior of said housing;
    b. heat insulating means dividing a portion of the interior of said housing into two compartments, one a sterilizing compartment and the other an asepticizer compartment;
    c. a first block member of heat conducting material defining the bottom of said sterilizer compartment;
    d. a second block member of heat conducting material in said asepticizer compartment, said block having a plurality of wells for receiving therein containers of saline solution;
    e. first heater means including a thermostat for maintaining the temperature of said first block member above 100° C.;
    f. second heater means including a thermostat for maintaining said second block member at an asepticizing temperature below 100° C.
    g. a single timer for controlling the cycle of operation of said first and second heater means; and
    h. a removable tray of heat conducting material adapted to rest on and receive heat from said first block member, said tray being adapted to accomodate a plurality of vials containing saline solution and said hydrophilic contact lenses.

9. Apparatus as set forth in claim 8 wherein said block members are in said housing spaced one from another, said insulating means being an air space between said block members.

10. Apparatus as set forth in claim 8, wherein said first block member has a recess therein adapted to receive said removable tray.

* * * * *